US009648120B2

(12) United States Patent
Fryc

(10) Patent No.: US 9,648,120 B2
(45) Date of Patent: May 9, 2017

(54) INTEGRATION OF INTENTIONAL NOISE INTO A COMMUNICATION CHANNEL TO SIMULATE ACTIVITY

(71) Applicant: Red Hat, Inc., Raleigh, NC (US)

(72) Inventor: Lukas Fryc, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 266 days.

(21) Appl. No.: 14/622,398

(22) Filed: Feb. 13, 2015

(65) Prior Publication Data
US 2016/0241658 A1 Aug. 18, 2016

(51) Int. Cl.
- *H04L 29/08* (2006.01)
- *H04W 12/10* (2009.01)
- *H04L 29/06* (2006.01)
- *G06F 21/43* (2013.01)
- *G06F 21/35* (2013.01)

(52) U.S. Cl.
CPC .............. *H04L 67/26* (2013.01); *G06F 21/35* (2013.01); *G06F 21/43* (2013.01); *H04L 29/08072* (2013.01); *H04L 63/0428* (2013.01); *H04W 12/10* (2013.01)

(58) Field of Classification Search
CPC ... G06F 21/35; G06F 21/43; H04L 29/08072; H04L 29/06
USPC ...... 709/220, 224, 227, 228; 455/411, 435.1
See application file for complete search history.

(56) References Cited

U.S. PATENT DOCUMENTS

| | | | |
|---|---|---|---|
| 6,421,781 B1 | 7/2002 | Fox et al. | |
| 6,779,030 B1 * | 8/2004 | Dugan | H04M 3/42136 379/221.08 |
| 8,281,392 B2 | 10/2012 | Sinha et al. | |

(Continued)

OTHER PUBLICATIONS

Tongxin Li, Xiaoyong Zhou, Luyi Xing, Yeonjoon Lee, Muhammad Naveed, Xiaofeng Wang, Xinhui Han, Mayhem in the Push Clouds: Understanding and Mitigating Security Hazards in Mobile Push-Messaging Services, Nov. 3-7, 2014, 12 pages, Peking University; Indiana University Bloomington; University of Illinois at Urbana-Champaign; Samsung Research America, retrieved from http://homes.soic.indiana.edu/zhou/files/mobile_cloud.pdf on Feb. 13, 2015.

(Continued)

*Primary Examiner* — Khanh Dinh
(74) *Attorney, Agent, or Firm* — Haynes and Boone, LLP

(57) ABSTRACT

An example method of simulating activity to conceal actual activity associated with a wireless network includes generating, at a push server, a sham push message operable to simulate activity on a communication channel between a push service provider and a target mobile device. The sham push message includes an indication that the sham push message is not an actual push message from a third party associated with the mobile application. The method also includes retrieving an application registration identifier associated with the mobile application hosted on the mobile device. The target mobile device is subscribed to the push service provider for push message delivery. The method further includes encrypting the sham push message. The method also includes transmitting the encrypted sham push message to the target mobile device associated with the application registration identifier.

20 Claims, 4 Drawing Sheets

(56) References Cited

U.S. PATENT DOCUMENTS

| | | | |
|---|---|---|---|
| 8,428,604 B2 | 4/2013 | Davies et al. | |
| 8,634,810 B2 | 1/2014 | Barkie et al. | |
| 8,856,314 B1* | 10/2014 | Schmidt | H04L 63/06 370/241 |
| 8,862,129 B2* | 10/2014 | Moshir | G06F 21/35 340/539.11 |
| 2013/0252585 A1* | 9/2013 | Moshir | G06F 21/35 455/411 |
| 2014/0196126 A1 | 7/2014 | Peterson et al. | |
| 2015/0072654 A1* | 3/2015 | Moshir | G06F 21/35 455/411 |
| 2016/0316363 A1* | 10/2016 | Li | H04W 12/04 |

OTHER PUBLICATIONS

Arif Sari, Dr. Beran Necat, Securing Mobile AD-HOC Networks Against Jamming Attacks Through Unified Security Mechanism, Jun. 2012, 16 pages, International Journal of Ad hoc, Sensor & Ubiquitous Computing (IJASUC) vol. 3, No. 3, Kyrenia, Cyprus, retrieved from http://airccse.org/journal/ijasuc/papers/0612asuc06.pdf on Feb. 13, 2015.

Min-Kyu Choi, Rosslin John Robles, Chang-Hwa Hong, Tai-Hoon Kim, Wireless Network Security: Vulnerabilities, Threats and Countermeasures, Jul. 2008, 10 pages, International Journal of Multimedia and Ubiquitous Engineering, vol. 3, No. 3, School of Multimedia, Hannam University, Daejeon, Korea, retrieved from http://www.sersc.org/journals/IJMUE/vol3_no3_2008/8.pdf on Feb. 13, 2015.

Scott Andrews, Juarez Barbosa Junior, Virginijus Kaminas, Jia Lei Ma, Dale Sue Ping, Madlin Seidel; Securing Your Mobile Business with IBM Worklight, Oct. 2013; 180 pages, IBM, retrieved from http://www.redbooks.ibm.com/redbooks/pdfs/sg248179.pdf on Feb. 13, 2015.

\* cited by examiner

INTEGRATION OF INTENTIONAL NOISE INTO A COMMUNICATION CHANNEL TO SIMULATE ACTIVITY

BACKGROUND

A push server may send messages to a mobile application installed on a mobile device. An application developer may set up a server that sends push messages to a push service provider, which then sends the push messages to the mobile device. The mobile application may register to receive the push messages, and when the server-side application has an update for the user, the server-side application may send a push message to the mobile device via the push server and push service provider.

BRIEF SUMMARY

According to an embodiment, a method of simulating activity to conceal actual activity associated with a wireless network includes generating, at a push server, a sham push message operable to simulate activity on a communication channel between a push service provider and a target mobile device. The sham push message includes an indication that the sham push message is not an actual push message from a third party associated with the mobile application. The method also includes retrieving an application registration identifier associated with the mobile application hosted on the mobile device. The target mobile device is subscribed to the push service provider for push message delivery. The method further includes encrypting the sham push message. The method also includes transmitting the encrypted sham push message to the target mobile device associated with the application registration identifier.

According to another embodiment, a system for simulating activity to conceal actual activity associated with a wireless network includes a memory that stores one or more application registration identifiers associated with one or more mobile applications hosted on one or more target mobile devices. The system also includes an encryptor that encrypts one or more sham push messages operable to simulate activity on a communication channel between a push service provider and a target mobile device. The system further includes a message generator that generates a sham push message including an indication that the sham push message is not an actual push message from a third party associated with a mobile application, retrieves an application registration identifier associated with the mobile application hosted on the mobile device, and transmits the encrypted sham push message to the target mobile device associated with the application registration identifier. The target mobile device is subscribed to the push service provider for push message delivery.

According to another embodiment, a non-transitory machine-readable medium includes a plurality of machine-readable instructions that when executed by one or more processors are adapted to cause the one or more processors to perform a method including: generating, at a push server, a sham push message operable to simulate activity on a communication channel between a push service provider and a target mobile device, the sham push message including an indication that the sham push message is not an actual push message from a third party associated with the mobile application; retrieving an application registration identifier associated with the mobile application hosted on the mobile device, where the target mobile device is subscribed to the push service provider for push message delivery; encrypting the sham push message; and transmitting the encrypted sham push message to the target mobile device associated with the application registration identifier.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A user's mobile device may be subscribed to a mobile network and receive messages. The fact that the user's mobile device is receiving data may trigger an important activity. The present disclosure provides techniques to circumvent this by sending more messages to the mobile device to simulate activity. In this way, a snooper is unable to distinguish an actual communication from a simulated one. Additionally, activity information may be hidden from third parties and may maintain a channel between the cloud and the user's mobile device. In an example, a mobile application may be installed on the user's mobile device to send messages out. As such, noise may be added to the communication channel to make it difficult for others to distinguish between actual and sham communications. When the user's mobile device phone receives the sham messages, the mobile device recognizes them as simulated and not actual messages.

The sender of the message may encrypt the data and send it over the network to the recipient for decryption and review. Accordingly, even if the snooper is able to determine that such activity is occurring, the snooper has a difficult time making sense of the communication. The present disclosure provides techniques that are preventative and makes it difficult for a snooper to determine in general when an important activity is occurring.

According to an embodiment, a method of simulating activity to conceal actual activity associated with a wireless network includes generating, at a push server, a sham push message operable to simulate activity on a communication channel between a push service provider and a target mobile device. The sham push message includes an indication that the sham push message is not an actual push message from a third party associated with the mobile application. The method also includes retrieving an application registration identifier associated with the mobile application hosted on the mobile device. The target mobile device is subscribed to the push service provider for push message delivery. The method further includes encrypting the sham push message. The method also includes transmitting the encrypted sham push message to the target mobile device associated with the application registration identifier.

II. Example System Architecture

Figure 1:
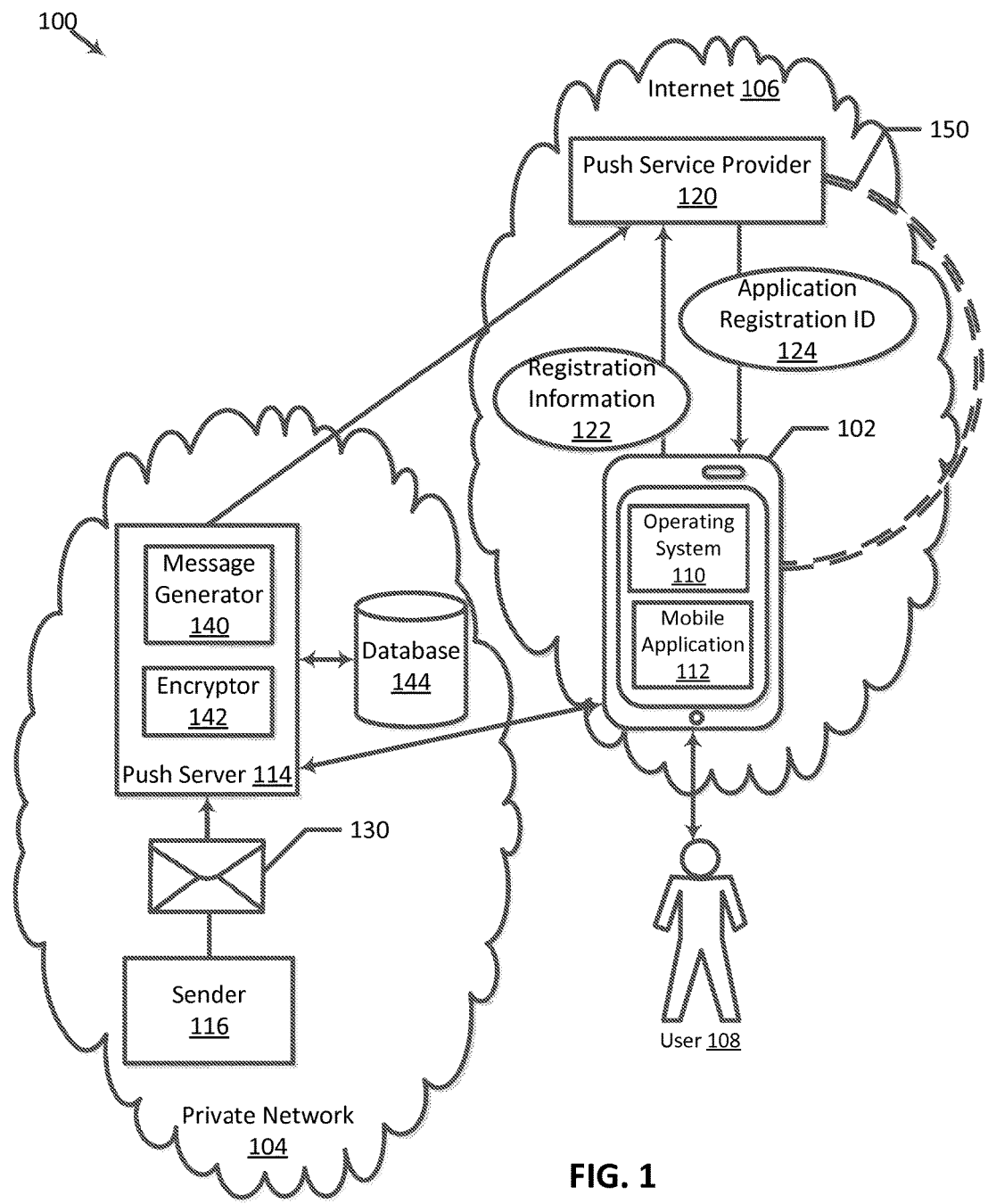
FIG. 1 is a block diagram illustrating a system for simulating activity to conceal actual activity associated with a wireless network, according to some embodiments.

FIG. 1 is a block diagram illustrating a system 100 for simulating activity to conceal actual activity associated with a wireless network, according to some embodiments. FIG. 1 includes a mobile device 102 coupled to a private network 104 and the Internet 106. Mobile device 102 may be, for example, a mobile phone, personal digital assistant (PDA), tablet, or laptop, or other mobile device having at least one processor and memory.

Private network 104 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and Hypertext Transport Protocol (HTTP), and various combinations of the foregoing Mobile device 102 includes an operating system 110 and a mobile application 112 that receives messages over one or more networks. Mobile device 102 hosts mobile application 112. A user 108 of mobile device 102 may download mobile application 112 onto the mobile device, or mobile device 102 may come pre-installed with mobile application 112 such that it is unnecessary for the user to download the mobile application onto mobile device 102.

A push server 114 and a sender 116 may be coupled to private network 104 and be registered with a push service provider 120. In some embodiments, push service provider 120 is located in the Cloud. In some embodiments, push service provider 120 is not located in the Cloud. In an example, push service provider 120 is a non-cloud based provider that is a self-hosted service with its own custom Uniform Resource Locator (URL). In such an example, the endpoint URL may be the application registration ID.

Sender 116 may send one or more push messages to mobile devices via push server 114. In the example illustrated in FIG. 1, sender 116 is the sender of push message 130. Sender 116 may be, for example, a server-side application, web service, and/or an automated system. Sender 116 may be a third-party server-side application that sends messages to mobile application 112. In an example, sender 116 is a stock exchange application that monitors changes in stocks. If an event occurs (e.g., a particular stock has fallen below a threshold price), the stock exchange application may desire to push a message to mobile device 102 to inform user 108 about the event. Although one sender is illustrated as sending a message to mobile device 102, it should be understood that more than one sender may send a message to mobile device 102. Additionally, push server 114 may receive a message from more than one sender and push the one or more messages to push service provider 120 for delivery to their target mobile devices.

Push server 114 includes a message generator 140 and an encryptor 142. Message generator 140 generates push messages based on requests from third parties (e.g., sender 116), and encryptor 142 encrypts the push messages. Push server 114 transmits the encrypted push messages to a push service provider 120, and may use push service provider 120 to store push messages until they are delivered to the end-user mobile device.

Mobile application 112 and mobile device 102 may register with push service provider 120 to receive push messages. Mobile device 102 may provide registration information 122 to push service provider 120, which may receive the registration request. In response to mobile application 112 and mobile device 102 registering to receive push messages, push service provider 120 may return an application registration identifier (ID) 124 to mobile device 102. Application registration ID 124 is a unique identifier of and specific to mobile application 112 installed on mobile device 102, and is tied to mobile device 102. Application registration ID 124 contains information that enables push service provider 120 to locate mobile device 102 on which mobile application 112 is installed. Accordingly, mobile device 102 is subscribed to push service provider 120 for push message delivery. Push service provider 120 may use application registration ID 124 to create a mobile endpoint, to which it can transmit push messages received from push server 114. Application registration ID 124 identifies a mobile application within the target mobile device, and may also be referred to, for example, as a device token or a registration identifier.

Mobile device 102 receives application registration ID 124 from push service provider 120 and sends application registration ID 124 to push server 114. Mobile application 112 registers with push server 114 and provides it with application registration ID 124 so that push server 114 can use application registration ID 124 in communications with push service provider 120. Push server 114 stores application registration ID 124 in a database 144, and uses application registration ID 124 if push server 114 wants to transmit a push message to mobile device 102. For example, push server 114 pushes push messages to mobile device 102 by providing its associated application registration ID 124. Push server 114 communicates with push service provider 120 to transmit push message 130 to mobile device 102. Push service provider 120 mediates communication between sender 116 and mobile application 112 through a universal push service that communicates with mobile device 102. Push service provider 120 may include servers that receive push messages from push server 114 and forwards them to mobile devices. The servers included in push service provider 120 may receive push messages from one or more push servers and transmit those push messages to their target mobile devices running one or more mobile applications. Mobile device 102 may create a communication channel 150 with push service provider 120, which is an endpoint of the communication channel. In some examples, communication channel 150 exposes a uniform resource identifier (URI) that push server 114 uses to send push messages to a target mobile device.

In some examples, push server 114 and push service provider 120 may be controlled by different entities. In such an example, push service provider 120 may be a third-party push service provider that is controlled by an entity different from push server 114. It may be undesirable from the perspective of sender 116 for push service provider 120 to be able to gauge actual activity between any sender of a push message and their target mobile devices. For example, sender 116 may find it undesirable for any third party to figure out when actual communications are occurring and being sent from sender 116 to mobile device 102. In an example, if sender 116 were a stock exchange application, it may find it undesirable for any third party to know when messages regarding stocks that may be of interest to user 108 are sent to mobile device 102. Additionally, user 108 may find it undesirable for this activity to be so easily determined by a snooper and may want to keep this activity hidden.

The present disclosure provides techniques for push server 114 to simulate activity to conceal actual activity associated with a wireless network. As will be discussed further below, push server 114 may simulate activity by generating one or more sham push messages and sending them to mobile device 102 in order to conceal actual activity associated with mobile device 102. Mobile application 112 may also simulate activity by responding to the one or more sham push messages in order to conceal actual activity associated with mobile device 102.

Figure 2:
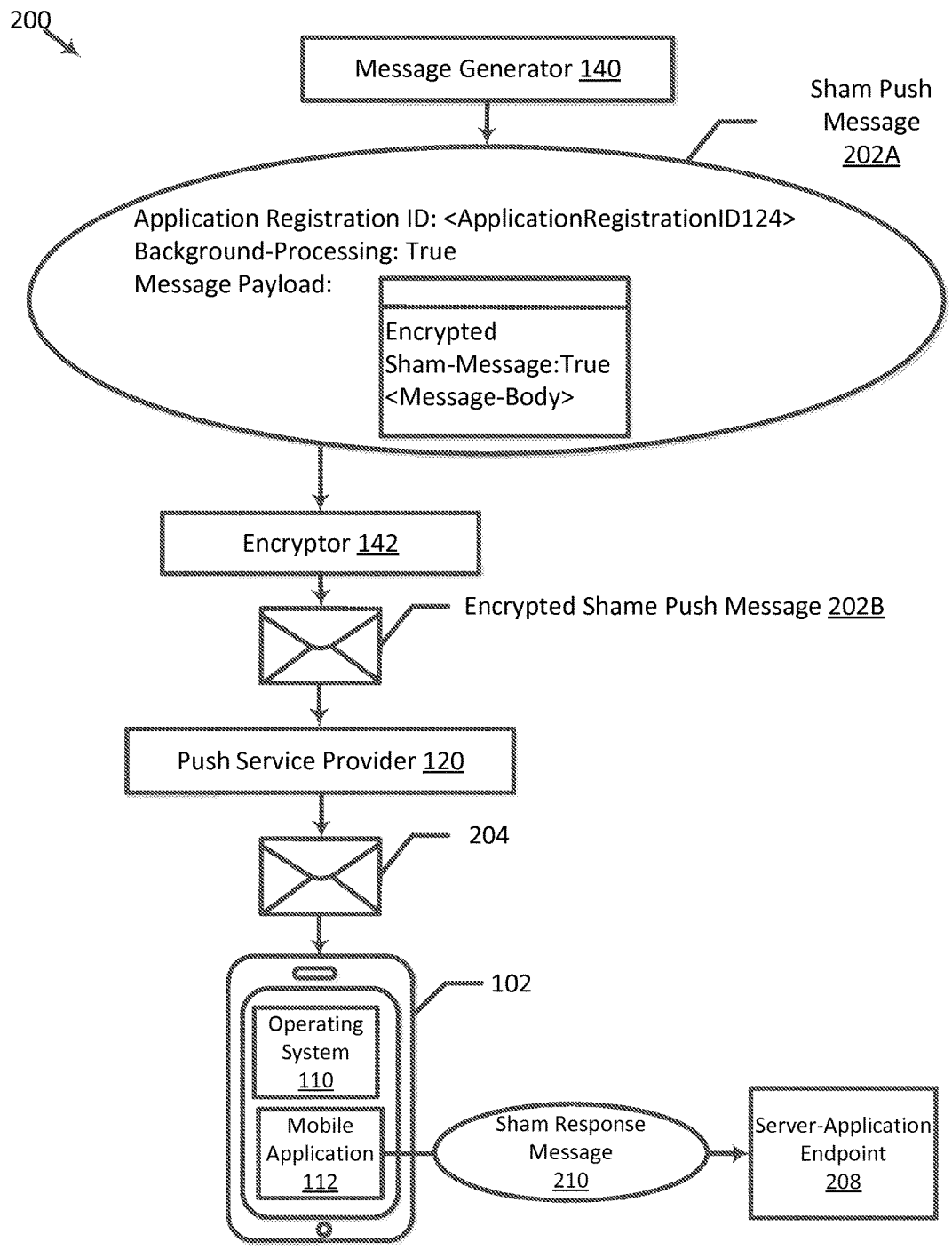
FIG. 2 illustrates a process flow of a push server sending a sham push message to conceal actual activity associated with a wireless network, according to some embodiments.

FIG. 2 illustrates a process flow 200 of push server 114 sending a sham push message to conceal actual activity associated with a wireless network, according to some embodiments. In FIG. 2, message generator 140 generates a sham push message 202A operable to simulate activity on the wireless network. For example, sham push message 202A may simulate activity between push server 114 and push service provider 120 and also on communication channel 150 between push service provider 120 and target mobile device 102.

Typically, message generator 140 generates a push message based on a request from a third-party (e.g., sender 116) to transmit a message to mobile device 102. Push messages that are based on actual requests from third-party senders may be referred to as actual push messages because they are real messages and based on real information in which user 108 may be interested. An actual push message is based on an event of interest to a user and is not a sham message that is generated merely to introduce noise into communication channel 150. The third-party sender that typically sends an actual push message may be, for example, a server-side application or web service in which the user is interested in receiving updates. For example, the user may have downloaded the mobile application associated with the server-side application and may be interested in receiving updates from the server-side application.

In contrast, push messages that are not based on actual requests from third-party senders may be referred to as sham push messages because they are simulated at push server 114 and are not based on "real information." Rather, push server 114 generates a sham push message in order to introduce noise into communication channel 150 and simulate activity on the communication channel. In an example, the sham push message is not from a third-party sender (e.g., a server-side application or web service) in which the user is interested in receiving updates.

In the example illustrated in FIG. 2, sham push message 202A includes an "Application Registration ID" field, a "Background-Processing" field, and a message payload. Message generator 140 may generate sham push message 202A and retrieve application registration ID 124 from database 144, and include application registration ID 124 in sham push message 202A. Application registration ID 124 specifies the mobile device endpoint to which to send the sham push message. It should be understood that message generator 140 may retrieve an application registration ID associated with a different mobile device and generate a sham push message for this other mobile device if push server 114 desires to transmit a push message to this other mobile device.

Further, sham push message 202A includes an indication that the push message is not an actual push message from sender 116 seeking to notify mobile device 102 of an event. In some embodiments, the sham push message may include a flag or include particular text to indicate that a push message is a sham push message. In the example illustrated in FIG. 2, sham push message 202A includes a "Sham-Message" field having a Boolean value. If the "Sham-Message" field has a first value (e.g., "True"), then the push message is a sham push message. In contrast, if the "Sham-Message" field has a second value (e.g., "False"), then the push message is an actual push message. In another example, a push message may include an "Actual-Message" field having a Boolean value. If the "Actual-Message" field has a first value (e.g., "True"), then the push message is an actual push message. In contrast, if the "Actual-Message" field has a second value (e.g., "False"), then the push message is a sham push message.

Encryptor 142 encrypts sham push message 202A to obtain an encrypted push message 202B. It is desirable for push messages to be encrypted so that push service provider 120 is unable to read them and determine whether a push message is a sham push message or an actual push message. Push server 114 transmits encrypted sham push message 202B to push service provider 120 in order to conceal actual activity associated with the wireless network.

Push server 114 may transmit encrypted push messages to push service provider 120, for example, if a condition is satisfied. In an example, the condition is satisfied if a time interval has elapsed. The time interval may be consistent or random. For example, message generator 140 may include a pseudo-random number generator that generates a random number. After a time interval (e.g., in seconds or minutes) corresponding to this random number has elapsed, message generator 140 may generate sham push message 202A, encryptor 142 may encrypt sham push message 202A to obtain encrypted sham push message 202B, and push server 114 may transmit encrypted sham push message 202B to push service provider 120. In an example, if the pseudo-random number generator is 1649, then message generator 140 may wait until 1649 seconds has elapsed before generating a sham push message to be sent to a target mobile device.

In another example, push server 114 transmits, based on business events that are not actually important (e.g., changes in the stock that user 108 may or may not be interested in but that are statistically close to what user 108 is regularly interested in), encrypted push messages to push service provider 120. In another example, push server 114 transmits, based on channel activity statistics, encrypted push messages to push service provider 120. In such an example, the more often push server 114 sends actual messages to mobile device 102, the more often push server 114 may send sham messages to mobile device 102.

When push service provider 120 receives encrypted push message 202B, push service provider 120 may be unable to determine whether the push message is an actual push message based on a request from a third-party or is a sham push message generated by push server 114. As such, push service provider 120 may be unable to read any information from this communication or ascertain whether an important event has occurred.

Push service provider 120 receives encrypted sham push message 202B, and may perform some processing on it to obtain encrypted sham push message 204. In some examples, encrypted sham push message 202B is the same as encrypted sham push message 204. In such an example, push service provider 120 receives encrypted sham push message 202B and forwards it on to the appropriate mobile device endpoint. In another example, encrypted sham push message 204 is a reformatted version of encrypted sham push message 202B. Push service provider 120 transmits encrypted sham push message 204 to the target mobile device associated with application registration ID 124.

Mobile device 102 may receive encrypted sham push message 204. In some examples, operating system 110 may maintain a persistent connection to one or more of the servers included in push service provider 120. In an example, operating system 110 receives encrypted sham push message 204 and determines whether a mobile application installed on mobile device 102 is registered to receive push messages. If operating system 110 determines that mobile application 112 has registered to receive push messages, operating system 110 may pass encrypted sham push message 204 to mobile application 112 and hand over control to the mobile application. Mobile application 112 may be associated with a listener running on mobile device 102, and the listener may listen for messages addressed to mobile application 112. Mobile device 102 may communicate with mobile application 112 and start it up if necessary.

Mobile application 112 receives encrypted sham push message 204 and decrypts it. Mobile application 112 may determine whether the received push message is a sham push message. For example, mobile application 112 and push server 114 may support a common protocol that provides an indication of whether the push message is a sham push message or an actual push message. For example, mobile application 112 may decrypt encrypted sham push message 204 and read the value of the "Sham-Message." If the "Sham-Message" field is "True," mobile application 112 may determine that the received push message is a sham push message. In contrast, if the "Sham-Message" field is "False," mobile application 112 may determine that the received push message is an actual push message.

When a mobile application installed on mobile device 102 receives a push message, the mobile application may display content of the push message on a display of mobile device 102. In some examples, mobile application 112 performs one or more actions in response to receiving the sham push message. In an example, mobile application 112 may discard any sham push messages and also avoid displaying them (in encrypted or unencrypted form) on a display of mobile device 102. This may reduce user confusion. For example, if mobile application 112 were to display encrypted sham push message 204 to user 108 on a display of mobile device 102, the user would be shown meaningless text, which may lead to confusion.

In another example, mobile application 112 displays the content of the sham push message on a display of mobile device 102. In this example, user 108 may be requested to acknowledge receipt of the sham push message. User 108 may select the sham push message and in response to the selection, mobile application 112 may be launched so that it processes the sham push message.

In another example, mobile application 112 processes encrypted sham push message 204 in the background (and may or may not show user 108 the content of the sham push message). In the example illustrated in FIG. 2, the "Background-Processing" field value is "True." Accordingly, mobile application 112 may process encrypted sham push message 204 in the background.

Even though mobile application 112 may determine that the received push message is a sham push message, it may be desirable for mobile application 112 to perform an action to provide another level of activity concealment and make it more difficult for a third party (e.g., a snooper or push service provider 120) to distinguish actual push messages from sham push messages. Mobile application 112 may transmit response messages in response to actual push messages to server-application endpoint 208. Mobile application 112 may also be configured to respond to sham push messages as though they were actual push messages. In some examples, in response to receiving sham push message 204, mobile application 112 may establish a connection to a server-application endpoint 208, generate a sham response message 210 operable to simulate activity from target mobile device 102, and send sham response message 210 to server-application endpoint 208.

Server-application endpoint 208 may be used for actual and sham push messages. Server-application endpoint 208 may be an offering by an entity different from the one that controls push server 114. Mobile application 112 may generate a sham response message 210 and encrypt the sham response message before sending it to server-application endpoint 208. Server-application endpoint 208 may be on private network 204 or another network. By sending the encrypted sham response message to server-application endpoint 208, mobile application 112 simulates activity associated with a wireless network and makes it much more difficult for a third party (e.g., snooper or push service provider 120) to ascertain whether mobile device 102 received a sham push message or an actual push message. Rather, if mobile device 102 receives a sham push message, mobile device 102 provides a reaction similar to what it would do if mobile device 102 received an actual push message.

Server-application endpoint 208 receives the encrypted sham response message from mobile application 112. In some examples, server-application endpoint 208 performs one or more actions in response to receiving the encrypted sham response message. In an example, server-application endpoint 208 sends mobile application 112 an acknowledgement including an indication that the acknowledgement is a sham acknowledgement. In another example, server-application endpoint 208 sends a message to another component. Alternatively, mobile application 112 may decide not to encrypt the sham response message and send it to server-application endpoint 208.

As discussed above and further emphasized here, FIGS. 1 and 2 are merely examples, which should not unduly limit the scope of the claims. For example, it should be understood that one or more modules or components in FIG. 1 (e.g., message generator 140 and encryptor 142) may be combined with another module or component. It should also be understood that one or more modules or components in FIG. 1 may be separated into more than one module or component.

Moreover, although one sender and one push server are illustrated, other embodiments including more than one sender and/or more than one push server are within the scope of the present disclosure. Additionally, although one mobile device and one mobile application are illustrated, other embodiments including more than one mobile device and/or more than one mobile application installed on a mobile device are within the scope of the present disclosure.

Additionally, embodiments of the disclosure may be implemented at the application level of mobile device 102 or at the operating system level of mobile device 102. For example, the functionality of mobile application 112 may be incorporated into operating system 110 such that it is able to distinguish sham push messages from actual push messages and respond accordingly.

III. Example Method

Figure 3:
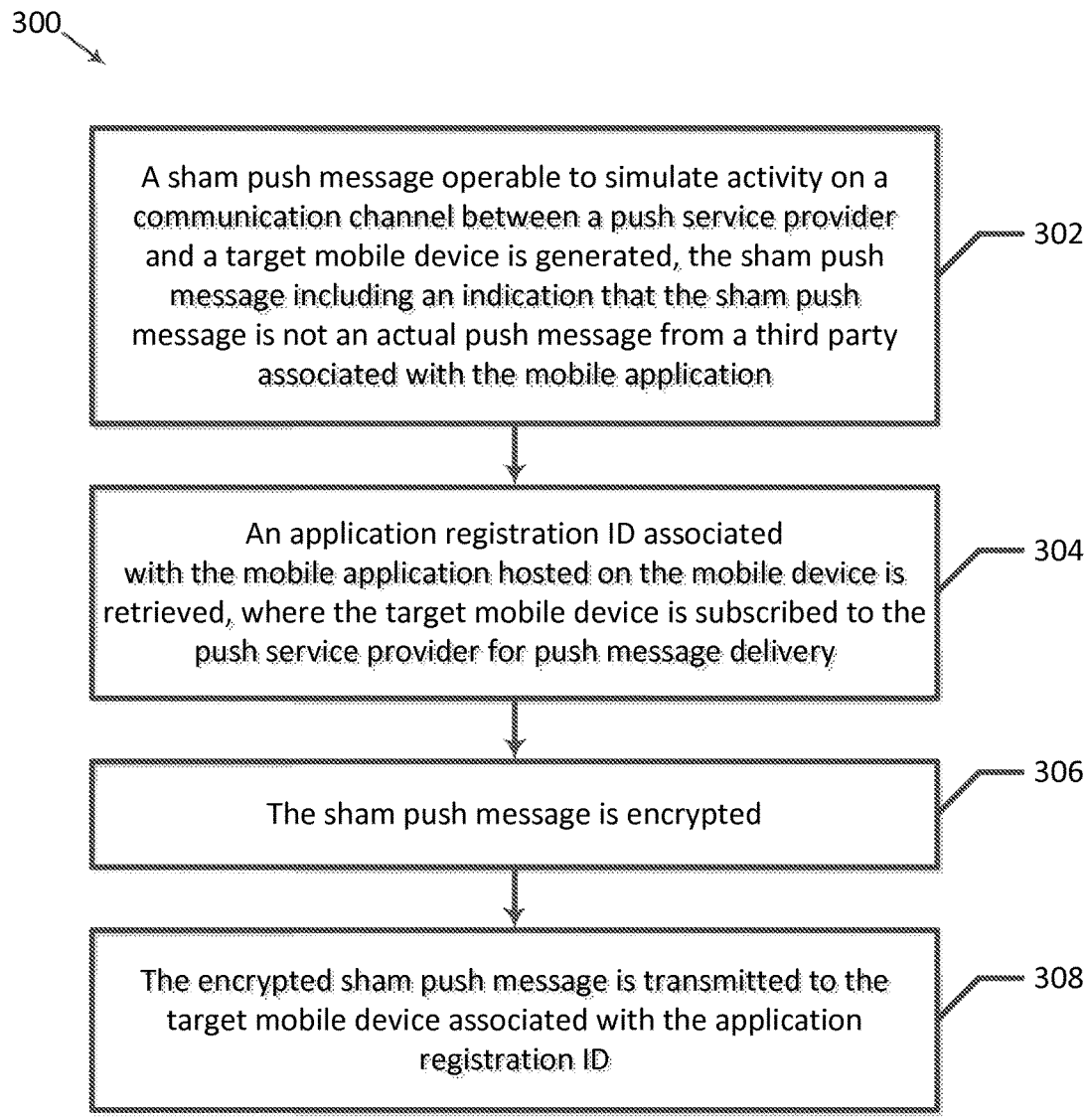
FIG. 3 is a flowchart illustrating a method of simulating activity to conceal actual activity associated with a wireless network, according to some embodiments.

FIG. 3 is a flowchart illustrating a method 300 of simulating activity to conceal actual activity associated with a wireless network, according to some embodiments. Method 300 is not meant to be limiting and may be used in other applications.

In FIG. 3, method 300 includes blocks 302-308. In a block 302, a sham push message operable to simulate activity on a communication channel between a push service provider and a target mobile device is generated, the sham push message including an indication that the sham push message is not an actual push message from a third party associated with the mobile application. In an example, push message generator 140 generates sham push message 202A operable to simulate activity on communication channel 150 between push service provider 120 and target mobile device 120, sham push message 202A including an indication that the sham push message is not an actual push message from a third party associated with mobile application 112. An actual push message is a message that is based on an application or web service that transmits informative data to mobile device 102 and is not used merely to conceal actual activity associated with a wireless network. For example, an actual push message may be sent from a server-side application or web service associated with mobile application 112. In contrast, a sham push message is a message generated by push server 114 and is not based on an application or web service that transmits informative or "real" data to mobile device 102. Rather, the sham push message is used to conceal actual activity associated with a wireless network.

In a block 304, an application registration ID associated with the mobile application hosted on the mobile device is retrieved, where the target mobile device is subscribed to the push service provider for push message delivery. In an example, message generator 140 retrieves application registration ID 124 associated with mobile application 112 hosted on mobile device 102, where mobile device 102 is subscribed to push service provider 120 for push message delivery.

In a block 306, the sham push message is encrypted. In an example, encryptor 142 encrypts sham push message 202A to obtain an encrypted sham push message 202B. In a block 308, the encrypted sham push message is transmitted to the target mobile device associated with the application registration ID. Push server 114 sends encrypted sham push message 202B to mobile device 102 using the services of push service provider 120. In an example, push server 114 transmits, via push service provider 120, the encrypted sham push message to target mobile device 102 associated with application registration ID 124.

In some embodiments, one or more actions illustrated in blocks 302-308 may be performed for any number of sham push messages generated by push server 114. It is also understood that additional processes may be performed before, during, or after steps 302-308 discussed above. It is also understood that one or more of the steps of method 300 described herein may be omitted, combined, or performed in a different sequence as desired.

IV. Example Computing System

Figure 4:
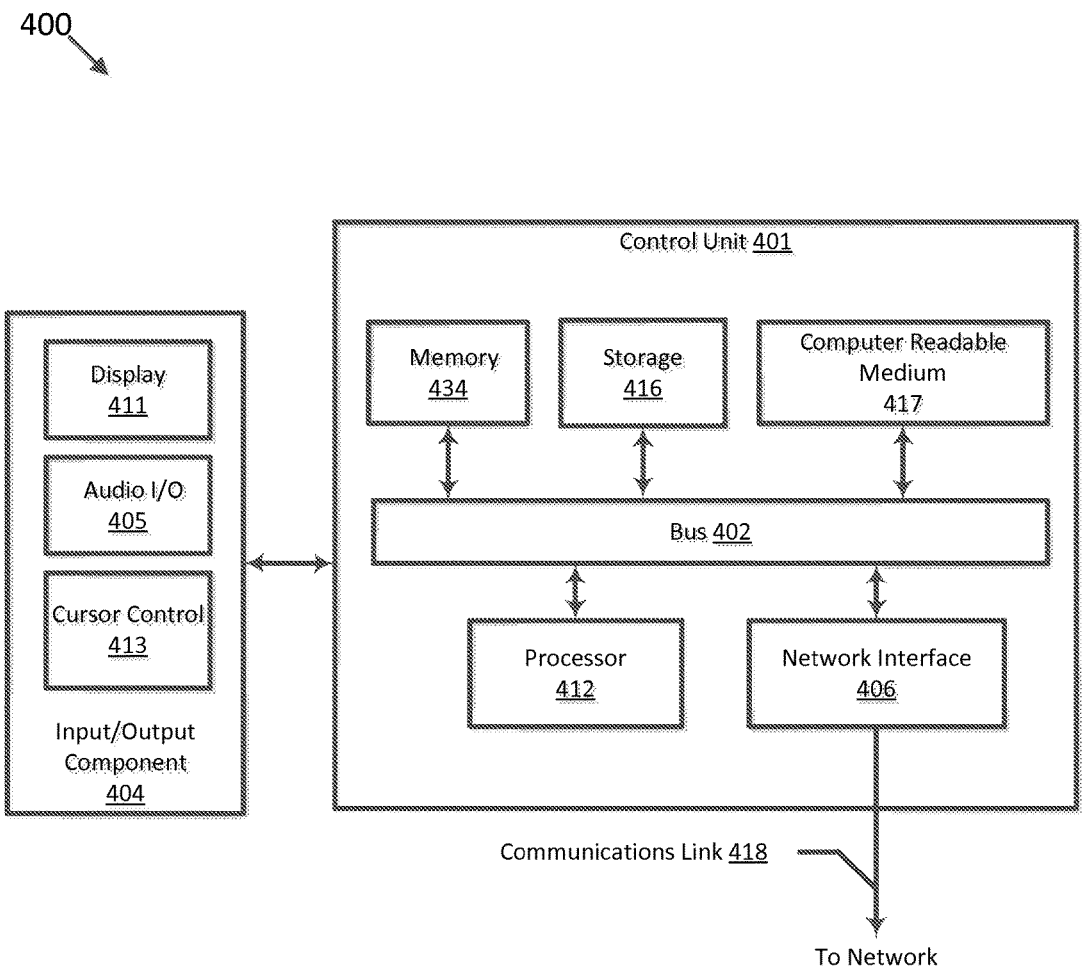
FIG. 4 is a block diagram of an electronic system suitable for implementing one or more embodiments of the present disclosure.

FIG. 4 is a block diagram of an example computer system 400 suitable for implementing any of the embodiments disclosed herein. In various implementations, each of message generator 140 and encryptor 142 may be implemented on computer system 400. The computer system 400 may include one or more processors 412. The computer system 400 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 for processing user actions, such as selecting keys from a keypad/keyboard or selecting one or more buttons or links, etc., and sending a corresponding signal to bus 402. I/O component 404 may also include an output component such as a display 411, and an input control such as a cursor control 413 (such as a keyboard, keypad, mouse, etc.). Display 411 may display content of an actual push message and/or sham push message.

An audio I/O component 405 may also be included to allow a user to use voice for inputting information by converting audio signals into information signals. Audio I/O component 405 may allow the user to hear audio. A transceiver or network interface 406 transmits and receives signals between computer system 400 and other devices via a communications link 418 to a network. In an embodiment, the transmission is wireless, although other transmission mediums and methods may also be suitable. In an example, sender 116 may be a human being who provides an instruction to push server 114 to transmit a push message to mobile device 102.

A processor 412, which may be a micro-controller, digital signal processor (DSP), or other processing component, processes these various signals, such as for display on display 411 of computer system 400 or transmission to other devices via communication link 418. A processor may also control transmission of information, such as cookies or IP addresses, to other devices.

Components of computer system 400 also include a system memory component 434 (e.g., RAM), a static storage component 416 (e.g., ROM), and/or a computer readable medium 417. Computer system 400 performs specific operations by one or more processors 412 and other components by executing one or more sequences of instructions contained in system memory component 434. Logic may be encoded in computer readable medium 417, which may refer to any medium that participates in providing instructions to one or more processors 412 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 434, and transmission media include coaxial cables, copper wire, and fiber optics, including wires that include bus 402.

In an embodiment, the logic is encoded in non-transitory computer readable medium. Computer readable medium 417 may be any apparatus that can contain, store, communicate, propagate, or transport instructions that are used by or in connection with processor 412. Computer readable medium 417 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 300) to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of simulating activity to conceal actual activity associated with a wireless network, comprising: generating, at a push server, a sham push message operable to simulate activity on a communication channel between a push service provider and a target mobile device, the sham push message including an indication that the sham push message is not an actual push message from a third party associated with the mobile application; retrieving an application registration identifier associated with the mobile application hosted on the mobile device, wherein the target mobile device is subscribed to the push service provider for push message delivery; encrypting the sham push message; and transmitting the encrypted sham push message to the target mobile device associated with the application registration identifier.

2. The method of claim 1, wherein the push service provider is a third-party push service provider.

3. The method of claim 1, wherein the generating includes generating the sham push message if a condition is satisfied.

4. The method of claim 3, wherein the condition is satisfied if a time interval has elapsed.

5. The method of claim 4, further including generating a pseudo-random number, wherein the condition is satisfied if the time interval corresponding to the pseudo-random number has elapsed.

6. The method of claim 1, further including: receiving, at the mobile application, the encrypted sham push message; and decrypting the sham push message.

7. The method of claim 6, further including: performing, at the mobile application, one or more actions in response to receiving the sham push message.

8. The method of claim 7, wherein the performing includes establishing a connection to a server-application endpoint, generating a sham response message operable to simulate activity from the target mobile device, encrypting the sham response message, and sending the encrypted sham response message to the server-application endpoint.

9. The method of claim 1, further including: determining, at the mobile application, that the received push message is a sham push message based on the indication.

10. The method of claim 1, wherein the transmitting includes transmitting, via the push service provider, the encrypted sham push message to the target mobile device associated with the application registration identifier.

11. A system for simulating activity to conceal actual activity associated with a wireless network, comprising: a memory that stores one or more application registration identifiers associated with one or more mobile applications hosted on one or more target mobile devices; an encryptor that encrypts one or more sham push messages operable to simulate activity on a communication channel between a push service provider and a target mobile device; and a message generator that generates a sham push message including an indication that the sham push message is not an actual push message from a third party associated with a mobile application, retrieves an application registration identifier associated with the mobile application hosted on the mobile device, and transmits the encrypted sham push message to the target mobile device associated with the application registration identifier, wherein the target mobile device is subscribed to the push service provider for push message delivery.

12. The system of claim 11, further including a client-side mobile application hosted on the target mobile device, wherein the mobile application receives the encrypted sham push message and decrypts the encrypted sham push message.

13. The system of claim 12, wherein the mobile application determines that the received push message is a sham push message based on the indication.

14. The system of claim 13, wherein the mobile application performs one or more actions in response to receiving the sham push message.

15. The system of claim 14, wherein in response to receiving the sham push message, the mobile application establishes a connection to a server-application endpoint, generates a sham response message operable to simulate activity from the target mobile device, and sends the sham response message to the server-application endpoint.

16. The system of claim 15, wherein the mobile application encrypts the sham response message and sends the encrypted sham response message to the server-application endpoint.

17. The system of claim 15, wherein the mobile application receives an acknowledgement from the server-application endpoint.

18. The system of claim 12, wherein the push server and the mobile application support that same protocol, and wherein the protocol specifies how to provide the indication that a push message is a sham push message.

19. The system of claim 11, further including a listener positioned on top of an operating system executable on the target mobile device, wherein the listener listens for push messages addressed to the mobile application.

20. A non-transitory machine-readable medium comprising a plurality of machine-readable instructions that when executed by one or more processors is adapted to cause the one or more processors to perform a method comprising:

generating, at a push server, a sham push message operable to simulate activity on a communication channel between a push service provider and a target mobile device, the sham push message including an indication that the sham push message is not an actual push message from a third party associated with the mobile application; retrieving an application registration identifier associated with the mobile application hosted on the mobile device, wherein the target mobile device is subscribed to the push service provider for push message delivery; encrypting the sham push message; and transmitting the encrypted sham push message to the target mobile device associated with the application registration identifier.

* * * * *